(12) United States Patent
Wagner

(10) Patent No.: US 11,644,122 B2
(45) Date of Patent: May 9, 2023

(54) ANTI-SIPHON/REGULATOR VALVE

(71) Applicant: Robin J. Wagner, Scottsdale, AZ (US)

(72) Inventor: Robin J. Wagner, Scottsdale, AZ (US)

( * ) Notice: Subject to any disclaimer, the term of this patent is extended or adjusted under 35 U.S.C. 154(b) by 0 days.

(21) Appl. No.: 17/352,113

(22) Filed: Jun. 18, 2021

(65) Prior Publication Data

US 2022/0403954 A1    Dec. 22, 2022

(51) Int. Cl.
*F16K 47/04* (2006.01)
*F16K 1/38* (2006.01)

(52) U.S. Cl.
CPC .............. *F16K 47/04* (2013.01); *F16K 1/38* (2013.01)

(58) Field of Classification Search
CPC . E03C 1/102; F15D 1/025; F16K 1/38; F16K 1/42; F16K 424/02; F16K 47/04; F16L 55/027; Y10T 137/2526; Y10T 137/3148; Y10T 137/3185; Y10T 137/86324
USPC ........... 138/44, 45; 222/321.3; 251/122, 124
See application file for complete search history.

(56) References Cited

U.S. PATENT DOCUMENTS

| | | | | |
|---|---|---|---|---|
| 2,250,291 A * | 7/1941 | Boosey | ................... | E03C 1/102 251/118 |
| 2,303,044 A * | 11/1942 | Goodrie | ................... | E03C 1/102 137/217 |
| 3,042,077 A * | 7/1962 | Waddington | ............ | B01F 35/71 137/895 |
| 3,768,962 A * | 10/1973 | Baranowski, Jr. | ...... | F23D 14/64 137/888 |
| 4,807,814 A * | 2/1989 | Douche | ................... | F04F 5/467 417/174 |
| 5,581,883 A * | 12/1996 | Matambo | ................ | F25B 41/37 29/890.035 |
| 5,862,829 A * | 1/1999 | Sand | ................. | B01F 25/31243 137/216 |
| 9,963,253 B2 * | 5/2018 | Williams | ................ | B65B 37/14 |
| 2008/0202506 A1 * | 8/2008 | Mahoney | ............. | A61M 11/003 128/200.21 |
| 2009/0218328 A1 * | 9/2009 | Johnson | ............. | B23K 15/0046 219/136 |
| 2010/0037629 A1 * | 2/2010 | Voorhis | ................... | F25B 41/30 138/44 |
| 2012/0307588 A1 * | 12/2012 | Hanada | ................. | B01F 25/312 366/336 |

* cited by examiner

*Primary Examiner* — Robert K Arundale
(74) *Attorney, Agent, or Firm* — Schmeiser, Olsen & Watts, LLP

(57) ABSTRACT

An anti-siphon/regulator valve is provided. The valve includes a body having a cylindrical portion and a frustoconical portion extending from the cylindrical portion. The valve includes an inlet opening formed in a first end of the body on the cylindrical portion and an outlet opening formed in a second end of the body on the frustoconical portion. The valve also includes an inner multi-tapered aperture extending from the inlet opening and the outlet opening. The valve operates to regulate fluid flow from the inlet opening through the outlet opening based on the geometry of the multi-tapered aperture, and to inhibit flow from the outlet opening through the inlet opening because of that same geometry.

4 Claims, 4 Drawing Sheets

ANTI-SIPHON/REGULATOR VALVE

BACKGROUND OF THE INVENTION

Technical Field

This invention relates generally to a valve and more particularly to an anti-siphon/regulator valve.

State of the Art

There are various systems that utilize pumps and fluids pumped or otherwise moved through pipes, conduits, tubes and the like through a fluid flow system. Such systems may include pool cleaning systems, irrigation systems, plumbing systems, agricultural water systems and so forth. There is often a need in such systems for preventing fluid from flowing back through certain conduits. In such cases, users often install an anti-siphon valve that allows fluid to travel in one direction and prevents it from traveling in the opposite direction. Conventional anti-siphon valves are mechanical in nature and include moving parts to operate. These anti-siphon valves are prone to failure because of the moving parts and are difficult to install. Further, these anti-siphon valves do not include an ability to regulate flow without mechanical means.

Accordingly, there is a need for an improved an anti-siphon/regulator valve that does not have moving parts.

SUMMARY OF THE INVENTION

An embodiment includes an anti-siphon/regulator valve comprising: a body having a cylindrical portion and a frustoconical portion extending from the cylindrical portion; an inlet opening formed in a first end of the body on the cylindrical portion; an outlet opening formed in a second end of the body on the frustoconical portion; and an inner multi-tapered aperture extending from the inlet opening and the outlet opening.

Another embodiment includes a method of using an anti-siphon/regulator valve, the method comprising: coupling an anti-siphon/regulator valve in-line on a conduit, the anti-siphon/regulator valve comprising: a body having a cylindrical portion and a frustoconical portion extending from the cylindrical portion; an inlet opening formed in a first end of the body on the cylindrical portion; an outlet opening formed in a second end of the body on the frustoconical portion; and an inner multi-tapered aperture extending from the inlet opening and the outlet opening; flowing fluid through the conduit utilizing pressure to push or draw the fluid through the conduit; regulating flow of fluid through the anti-siphon/regulator valve in a single direction from the inlet opening to the outlet opening in response to fluid flowing through the inner multi-tapered aperture; and preventing fluid flow through the outlet opening through the inlet opening after terminating fluid flow through the conduit in response to the geometry of the outlet opening, the inner multi-tapered aperture and the inlet opening.

The foregoing and other features and advantages of the present invention will be apparent from the following more detailed description of the particular embodiments of the invention, as illustrated in the accompanying drawings.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

DETAILED DESCRIPTION OF EMBODIMENTS OF THE INVENTION

As discussed above, embodiments of the present invention relate to an anti-siphon/regulator valve that does not have any mechanical or moving parts.

Figure 1:
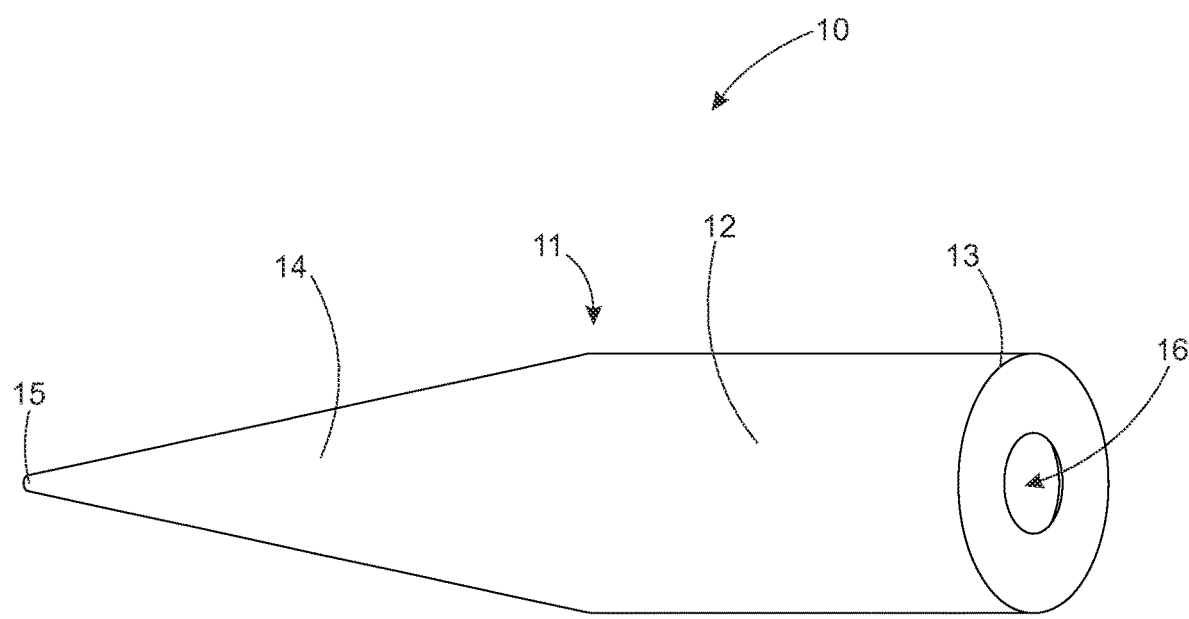
FIG. 1 is a first perspective view of an anti-siphon/regulator valve according to an embodiment.
Figure 2:
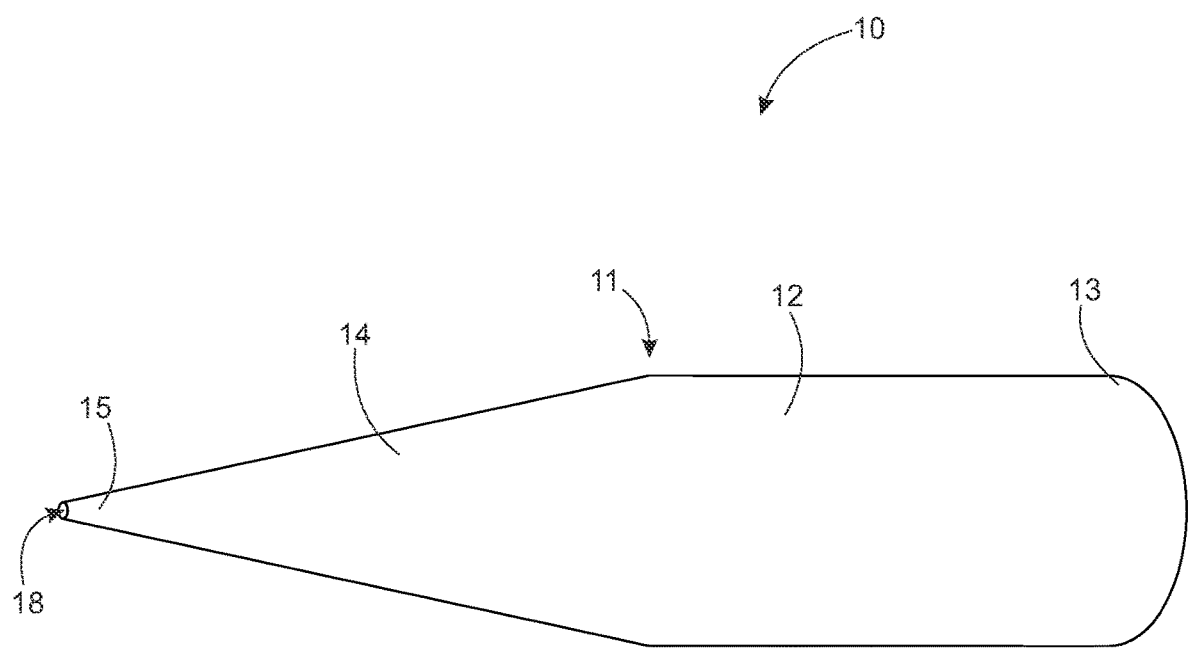
FIG. 2 is a second perspective view of an anti-siphon/regulator valve according to an embodiment.
Figure 3:
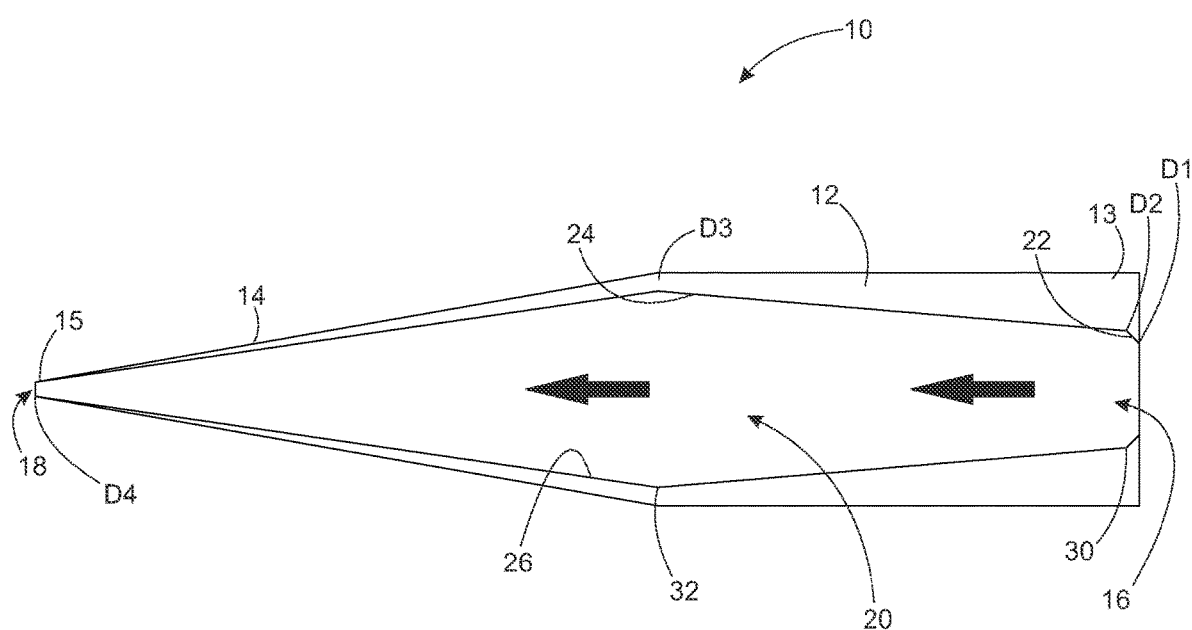
FIG. 3 is a section view of an anti-siphon/regulator valve according to an embodiment.

Referring to FIGS. 1-3, an anti-siphon/regulator valve 10 is depicted according to an embodiment. The valve 10 comprises a body 11 having a cylindrical portion 12 and a frustoconical portion 14 extending from the cylindrical portion 12. The cylindrical portion has a first end 13 with an inlet opening 16 formed in the first end 13 of the body 11 on the cylindrical portion 12. The frustoconical portion 14 of the body 11 has a second end 15 with an outlet opening 18 formed in the second end 15 of the body 11 on the frustoconical portion 14. The valve 14 may further comprise an inner multi-tapered aperture 20 extending from the inlet opening 16 and the outlet opening 18.

The inner multi-tapered aperture 20 comprises a plurality of frustoconical portions, wherein the plurality of frustoconical portions of the inner multi-tapered aperture 20 includes, in order from the inlet opening 16 to the outlet opening 18, a first frustoconical portion 22 adjacent the inlet opening 16, a second frustoconical portion 24, and a third frustoconical portion 26 adjacent the outlet opening 18.

The first frustoconical portion 22 may comprise a first expanding taper from the inlet opening 16 to a first transition location 30. The diameter of the first frustoconical portion 22 transitions from a first diameter D1 equal to a diameter of the inlet opening 16 to second diameter D2 at the first transition location 30, the second diameter D2 being greater than the first diameter D1. In some embodiments, the angle of the taper of the first frustoconical portion 22 is 45 degrees.

The second frustoconical portion 24 may comprise a second expanding taper from the first transition location 30 to a second transition location 32. The second expanding taper is longer and at an angle less the angle of the first expanding taper. A diameter of the second frustoconical portion 24 transitions from the second diameter D2 to a third diameter D3 at the second transition location 32, the third diameter D3 being greater than the second diameter D2.

The third frustoconical portion 26 comprises a decreasing taper from the second transition location 32 to outlet opening 18. A diameter of the third frustoconical portion 26 transitions from the third diameter D3 to a fourth diameter D4 at the outlet opening 16, the fourth diameter D4 being smaller than the third diameter D3 and equal to the diameter of the outlet opening 18.

These first, second and third frustoconical portions 22, 24 and 26 form the geometry of the inner multi-tapered aperture 20. This geometry operates to regulate flow of fluid through the valve 10 and prevents siphoning of fluid back through the outlet opening 18 and out the inlet opening in a direction opposite the desired and intended direction of fluid flow.

Figure 4:
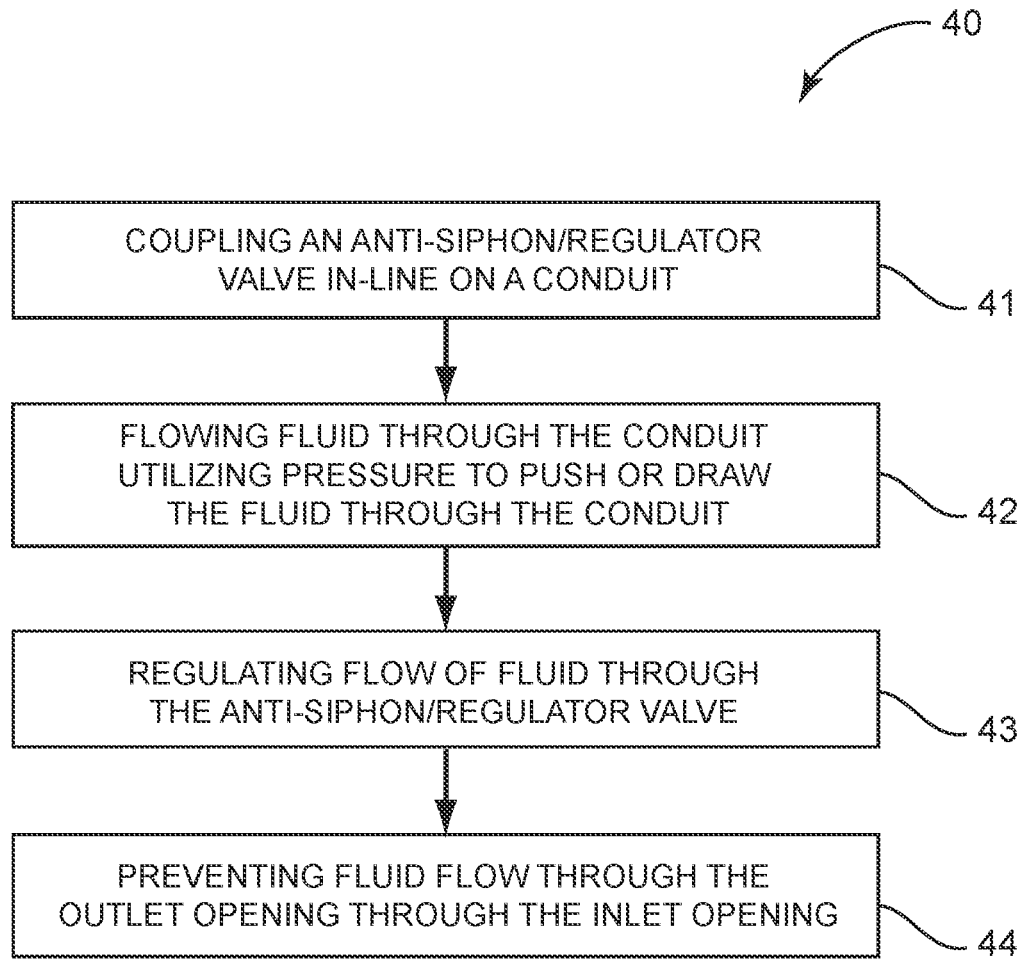
FIG. 4 is a flow chart of a method of using an anti-siphon/regulator valve according to an embodiment.

Referring to FIG. 4, an embodiment of a method 40 of using an anti-siphon/regulator valve is depicted. The method 40 comprises coupling an anti-siphon/regulator valve in-line on a conduit (Step 41); flowing fluid through the conduit utilizing pressure to push or draw the fluid through the conduit (Step 42); regulating flow of fluid through the anti-siphon/regulator valve in a single direction from the inlet opening to the outlet opening in response to fluid flowing through the inner multi-tapered aperture (Step 43); and preventing fluid flow through the outlet opening through the inlet opening after terminating fluid flow through the conduit in response to the geometry of the outlet opening, the inner multi-tapered aperture and the inlet opening (Step 44).

The embodiments and examples set forth herein were presented in order to best explain the present invention and its practical application and to thereby enable those of ordinary skill in the art to make and use the invention. However, those of ordinary skill in the art will recognize that the foregoing description and examples have been presented for the purposes of illustration and example only. The description as set forth is not intended to be exhaustive or to limit the invention to the precise form disclosed. Many modifications and variations are possible in light of the teachings above without departing from the spirit and scope of the forthcoming claims.

The invention claimed is:

1. An anti-siphon/regulator device comprising:
a body having a cylindrical portion and a frustoconical portion extending from the cylindrical portion;
an inlet opening formed in a first end of the body on the cylindrical portion;
an outlet opening formed in a second end of the body on the frustoconical portion; and
an inner multi-tapered aperture extending from the inlet opening and the outlet opening;
wherein:
the inner multi-tapered aperture comprises a plurality of frustoconical portions;
the plurality of frustoconical portions of the inner multi-tapered aperture includes, in order from the inlet opening to the outlet opening, a first frustoconical portion adjacent the inlet opening, a second frustoconical portion, and a third frustoconical portion adjacent the outlet opening; and
the first frustoconical portion comprises a first expanding taper from the inlet opening to a first transition location, wherein the diameter of the first frustoconical portion transitions from a first diameter equal to the inlet opening to second diameter at the first transition location, the second diameter being greater than the first diameter.

2. The device of claim 1, wherein the angle of the taper of the first frustoconical portion is 45 degrees.

3. The device of claim 1, wherein the second frustoconical portion comprises a second expanding taper from the first transition location to a second transition location, wherein the second expanding taper is longer and at an angle less the angle of the first expanding taper, wherein a diameter of the second frustoconical portion transitions from the second diameter to a third diameter at the second transition location, the third diameter being greater than the second diameter.

4. The device of claim 3, wherein the third frustoconical portion comprises a decreasing taper from the second transition location to outlet opening, wherein a diameter of the third frustoconical portion transitions from the third diameter to a fourth diameter at the outlet opening, the fourth diameter being smaller than the third diameter and equal to the diameter of the outlet opening.

* * * * *